United States Patent
Tang et al.

(10) Patent No.: US 8,260,347 B2
(45) Date of Patent: Sep. 4, 2012

(54) RADIO FREQUENCY COMMUNICATION DEVICES AND METHODS

(75) Inventors: Weimin Tang, Singapore (SG); Ern Tang Chu, Singapore (SG); Chao Li, Singapore (SG)

(73) Assignee: Intel Mobile Communications GmbH, Neubiberg (DE)

( * ) Notice: Subject to any disclaimer, the term of this patent is extended or adjusted under 35 U.S.C. 154(b) by 619 days.

(21) Appl. No.: 12/123,595

(22) Filed: May 20, 2008

(65) Prior Publication Data

US 2009/0291647 A1 Nov. 26, 2009

(51) Int. Cl.
*H04M 1/00* (2006.01)
*H04B 1/18* (2006.01)

(52) U.S. Cl. ............... 455/553.1; 455/289; 455/290; 455/275; 455/82; 455/123

(58) Field of Classification Search ............... 455/553.1, 455/78, 121, 193.1, 275, 276.1, 277.1, 286, 455/287, 289, 290, 132
See application file for complete search history.

(56) References Cited

U.S. PATENT DOCUMENTS

| | | | |
|---|---|---|---|
| 2,622,150 A | 12/1952 | Coulter et al. | |
| 3,728,731 A * | 4/1973 | Choi et al. | 370/339 |
| 3,781,684 A * | 12/1973 | Inslerman | 455/11.1 |
| 4,910,481 A * | 3/1990 | Sasaki et al. | 333/134 |
| 5,815,804 A * | 9/1998 | Newell et al. | 455/78 |
| 5,973,568 A | 10/1999 | Shapiro et al. | |
| 6,072,999 A * | 6/2000 | Konishi et al. | 455/286 |
| 6,332,071 B1 | 12/2001 | Brandt | |
| 6,356,536 B1 | 3/2002 | Repke | |
| 6,448,932 B1 | 9/2002 | Stoiljkovic et al. | |
| 6,531,984 B1 * | 3/2003 | Johannisson et al. | 343/700 MS |
| 6,624,720 B1 * | 9/2003 | Allison et al. | 333/105 |
| 6,670,923 B1 * | 12/2003 | Kadambi et al. | 343/700 MS |
| 6,907,263 B2 | 6/2005 | Ho et al. | |
| 7,043,285 B2 | 5/2006 | Boyle | |
| 7,057,472 B2 * | 6/2006 | Fukamachi et al. | 333/101 |
| 7,155,252 B2 * | 12/2006 | Martin et al. | 455/553.1 |
| 7,251,459 B2 | 7/2007 | McFarland et al. | |
| 7,253,702 B2 * | 8/2007 | Kemmochi et al. | 333/133 |
| 7,333,831 B2 * | 2/2008 | Srinivasan et al. | 455/552.1 |
| 7,373,115 B2 | 5/2008 | Monroe | |
| 7,376,440 B2 | 5/2008 | Forrester et al. | |
| 7,397,324 B2 * | 7/2008 | Tang et al. | 333/126 |
| 7,894,779 B2 * | 2/2011 | Meiyappan et al. | 455/83 |
| 2002/0006810 A1 | 1/2002 | Schiller | |
| 2002/0183016 A1 * | 12/2002 | Kemmochi et al. | 455/83 |
| 2003/0092397 A1 * | 5/2003 | Uriu et al. | 455/82 |
| 2004/0033787 A1 | 2/2004 | Weber et al. | |
| 2006/0063493 A1 * | 3/2006 | Yanduru et al. | 455/77 |

(Continued)

OTHER PUBLICATIONS

Non-Final Office Action Dated Jan. 21, 2011 for U.S. Appl. No. 12/200,132. 21 Pages.

(Continued)

*Primary Examiner* — Duc M Nguyen
(74) *Attorney, Agent, or Firm* — Eschweiler & Associates, LLC

(57) ABSTRACT

One embodiment relates to a circuit for efficient wireless communication. The circuit includes a communication port adapted to be coupled to an antenna feed. Multiple communication paths stem from the communication port, where different communication paths are associated with different frequency bands. Multiple phase shift selection circuits are respectively associated with the multiple communication paths. The phase shift selection circuits have different respective impedances relative to the communication port and the respective impedances vary for the different frequency bands. Other methods and systems are also disclosed.

7 Claims, 5 Drawing Sheets

U.S. PATENT DOCUMENTS

| | | | |
|---|---|---|---|
| 2006/0178122 A1 | 8/2006 | Srinivasen et al. | |
| 2007/0105515 A1 | 5/2007 | Muterspaugh et al. | |
| 2007/0223615 A1 | 9/2007 | Dosanjh et al. | |
| 2008/0204163 A1* | 8/2008 | Royak et al. | 333/132 |
| 2008/0214138 A1 | 9/2008 | Gomez | |
| 2009/0153269 A1 | 6/2009 | Ono et al. | |
| 2009/0289861 A1* | 11/2009 | Tang et al. | 343/722 |

OTHER PUBLICATIONS

Radio Front-End Solutions, "MMM6025 GSM/GPRS Quad-Band, Front-End Power Amplifier Plus Antenna Switch", Freescale Semiconductor, Inc. 2004, 2 pgs.

U.S. Appl. No. 12/123,730, filed May 20, 2008, Tang et al.

U.S. Appl. No. 12/200,132, filed Aug. 28, 2008, Tang et al.

TriQuint Semiconductor, TQM6M4001 Advance Data Sheet, "3V Quad-Band GSM850/900 DCS/PCS Transmit Module", Revision 2.23, Feb. 3, 2005, 18 pgs.

Non-Final Office Action Dated Feb. 4, 2011 for U.S. Appl. No. 12/123,730.

Non-Final Office Action Dated Jun. 2, 2011 for U.S. Appl. No. 12/123,730. 20 Pages.

Final Office Action Dated Jul. 1, 2011 for U.S. Appl. No. 12/200,132. 33 Pages.

Final Office Action Dated Oct. 5, 2011 for U.S. Appl. No. 12/123,730.

Office Action Dated Nov. 21, 2011 for U.S. Appl. No. 12/200,132.

Final Office Action dated Apr. 25, 2012 for U.S. Appl. No. 12/200,132.

* cited by examiner

RADIO FREQUENCY COMMUNICATION DEVICES AND METHODS

FIELD OF DISCLOSURE

The present disclosure relates generally to methods and systems related to radio frequency (RF) communication devices.

BACKGROUND

In emerging markets throughout the world, such as China and India, the rising middle and low-to middle classes are demanding affordable wireless services. This requires wireless service providers to provide these customers with affordable access service as well as affordable handsets.

To deliver low cost handsets, engineers are continuously looking for ways to modify existing mobile phone architectures to achieve a lower cost design without giving up quality or desirable features.

SUMMARY

The following presents a simplified summary in order to provide a basic understanding of one or more embodiments. This summary is not an extensive overview, nor is it intended to identify key or critical elements of the disclosure. Rather, the primary purpose of the summary is to present some concepts in a simplified form as a prelude to the more detailed description that is presented later.

One embodiment relates to a circuit for efficient wireless communication. The circuit includes a communication port adapted to be coupled to an antenna feed. Multiple communication paths stem from the communication port, where different communication paths are associated with different frequency bands. Multiple phase shift selection circuits are respectively associated with the multiple communication paths. The phase shift selection circuits have different respective impedances relative to the communication port and the respective impedances vary for the different frequency bands.

The following description and annexed drawings set forth in detail certain illustrative aspects and implementations. These are indicative of only a few of the various ways in which the principles of the disclosure may be employed.

DETAILED DESCRIPTION

Figure 1:
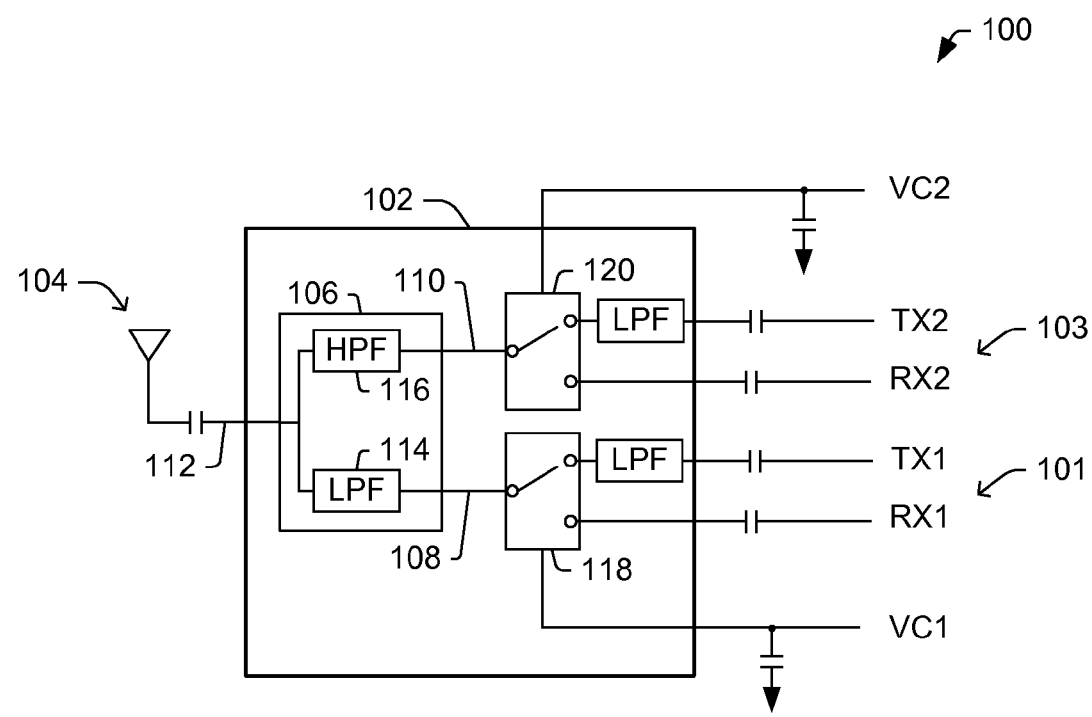
FIG. 1 shows a transceiver portion of wireless communication device that includes an antenna switch module (ASM)

One or more implementations will now be described with reference to the attached drawings, wherein like reference numerals are used to refer to like elements throughout. It will be appreciated that nothing in this specification is admitted as prior art.

Antenna switch modules (ASMs) are used in analog front-ends to perform transmit and receive switching in handsets. Each ASM costs up to $5 per piece, depending on the quantity purchased. Therefore, ASMs add substantially to the cost of the chip set implementing the wireless communication standards. Some aspects of the present disclosure relate to analog front end architectures that eliminate the need for an ASM, thereby facilitating chip sets with cost-points that are in line for emerging markets, disposable phones, etc.

FIG. 1 shows an example of a GSM/DCS dual band cellular phone that includes a front-end 100 with an ASM 102. For communication over a GSM frequency band 101, the phone transmits over transmit frequency channels TX1 (~880-915 MHz) and receives over reception frequency channels RX1 (~925-960 MHz). For communication over the DCS band 103, the phone transmits over transmit frequency channels TX2 (~1710-1785 MHz) and receives over reception frequency channels RX2 (~1805-1880 MHz).

To transmit and receive data over these channels, the ASM 102 includes a diplexer 106 that implements frequency domain multiplexing. This diplexer 106 includes two ports (e.g., 108 and 110) that are multiplexed onto a single communication port (e.g., 112), which is coupled to the base of a single feed antenna 104. A lowpass filter 114 connects ports 108 and 112 and high pass filter 116 connects ports 110 and 112. Ideally, all the signal power on ports 108 and 110 is transferred to the communication port 112 (and vice versa), and the separation of the signals on 108 and 110 is complete (e.g., no power of 108 is transferred to 110 via 112). In the real world, however, some power will be lost, and some signal power will leak to the wrong port.

To ensure adequate isolation between the transmit channels and receive channels within a given band (e.g., TX1 and RX1), the ASM 102 also includes a pair of switches 118, 120. During communication, each switch is set to one of two positions. In this manner, for a given band each switch selectively passes either transmit frequency channels or receive frequency channels, while isolating the unselected frequency channels. For example, for the GSM band 101, if the switch 118 passes TX1, then RX1 will be blocked. In this manner, the switches 118, 120 provide sufficient isolation between the closely spaced transmit and receive frequency channels within a band.

While this front end 100 is sufficient for some applications, the expense associated with the ASM 102 makes it unrealistic for low cost cell phone architectures. In addition to cost concerns, the ASM 102 also is responsible for unavoidable insertion loss, which may cause degrade RF performance (e.g., decrease receive sensitivity and transmit power). Therefore, as now set forth in greater detail, the inventors have fashioned advantageous front-end architectures that eliminate the need for an ASM.

Figure 2:
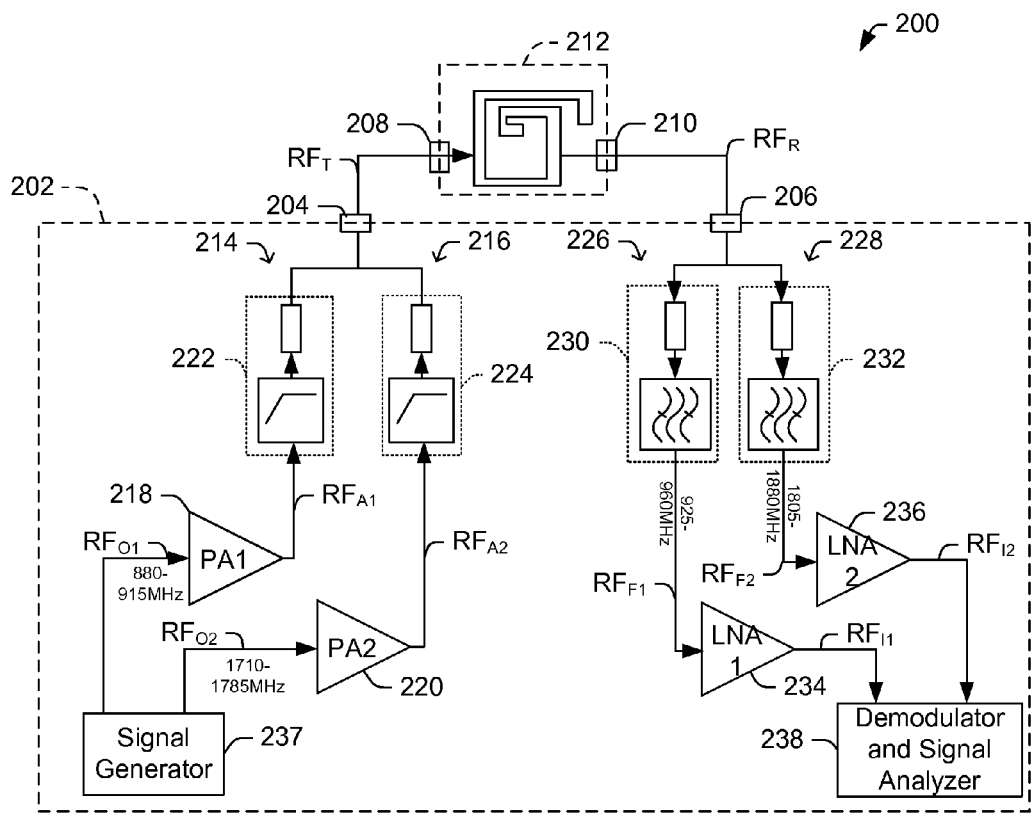
FIG. 2 shows a transceiver portion of a wireless communication device.

FIG. 2 depicts an embodiment of a dual band wireless communication device 200 having a dual-feed high isolation antenna architecture. To eliminate the need for an ASM, the wireless communication device 200 includes communication phase shift select circuits (e.g., 222, 224, 230, 232) that have impedances that vary as a function of communication frequency. Thus, these phase shift select circuits act as switches in some respects, but are much more affordable to implement. Although the following discussion will be set forth with reference to transmission and reception elements, it will be appreciated that communication elements could function as transmission or reception elements. Some structural features will be set forth over the next several paragraphs, after which a more detailed functional description will be set forth.

The wireless communication device 200 includes a transceiver 202 having a transmission port 204 and a reception port 206. The transmission port 204 is connected to a transmission feed 208 of a high isolation dual feed antenna 212, while the reception port 206 is coupled to a reception feed 210 of the dual feed antenna 212. In one embodiment, the dual feed antenna 212 could be a planar inverted F antenna (PIFA).

On the transmit-side, a first transmission path 214 and a second transmission path 216 stem from the transmission port 204. The first and second transmission paths 214, 216 include first and second power amplifiers 218, 220 and first and second transmission phase shift selection circuits 222, 224, respectively.

On the receive-side, a first reception path 226 and a second reception path 228 stem from the reception port 206. The first and second reception paths 226, 228 include first and second reception phase shift selection circuits 230, 232 and first and second low noise amplifiers 234, 236, respectively.

Although the illustrated embodiment shows two transmission paths 214, 216 and two reception paths 226, 228, in other embodiments more than two transmission paths could stem from the transmission port 204 and more than two reception paths could stem from the reception port 206. For example, in one embodiment of a quad-band phone, four transmission paths could stem from the transmission port 204, and four reception paths could stem from the reception port 206.

During communication, signals can be concurrently transmitted and received over the dual feed antenna 212. The transmitted signal $RF_T$, which is provided to the dual feed antenna 212 from the transmission port 204, can include frequency components falling within one of two transmission frequency bands. The first transmission path 214 provides a transmission signal over a first transmission frequency band, while the second transmission path 216 provides a transmission signal on a second transmission frequency band. The received signal $RF_R$, which is provided to the reception port 206 from the dual feed antenna 212, can include practically any frequency component detected by the dual feed antenna 212. Therefore, the first reception path 226 separates out signal components within a first reception frequency band, while the second reception path 228 separates out signal components within a second reception frequency band.

For purposes of clarity, an example is now set forth in the context of a GSM/DCS dual band phone. If the wireless communication device 200 desires to transmit over a first transmission frequency band (e.g., GSM band), a signal generator 237 generates an outgoing signal $RF_{O1}$ on the first transmission path 214. This outgoing signal $RF_{O1}$ is generated within the first transmission frequency band (e.g., 880-915 MHz). The first power amplifier 218 then amplifies or modulates the signal $RF_{O1}$, thereby generating an amplified signal $RF_{A1}$ that is passed to the first transmission phase shift selection circuit 222.

The first transmission phase shift selection circuit 222 is structured to represent an approximately matched impedance (e.g., 50 ohms) in the first transmission frequency band. Consequently, $RF_{A1}$ passes through the first transmission phase shift selection circuit 222 with limited or no attenuation at the first band while the high frequency components generated by the power amplifier 218 have been suppressed by the phase shift selection circuit 222. However, the second transmission phase shift selection circuit 224 is structured to represent a high or infinite impedance for the first transmission frequency band. Consequently, although $RF_{A1}$ passes through the first transmission phase shift selection circuit 222, it will not leak through the second transmission phase shift selection circuit 224 and a vast majority of the power in $RF_{A1}$ will be successfully transmitted to the dual feed antenna 212.

Conversely, if the communication device transmits over a second transmission frequency band (e.g., DCS band), the signal generator 237 generates an outgoing signal $RF_{O2}$ on the second transmission path 216. This outgoing signal $RF_{O2}$ is generated within the second transmission frequency band (e.g., 1710-1785 MHz). The second power amplifier 220 then amplifies or modulates the signal $RF_{O2}$, thereby generating an amplified signal $RF_{A2}$ that is passed to the second transmission phase shift selection circuit 224.

For the second transmission frequency band, the second transmission phase shift selection circuit 224 is structured to represent a matched impedance (e.g., 50 ohms). Consequently, although $RF_{A2}$ passes through the second transmission phase shift selection circuit 224, it will not leak through the first transmission phase shift selection circuit 222. Consequently, a vast majority of the power in $RF_{A2}$ will be successfully transmitted to the dual feed antenna 212. In this way, the two transmission channels remain isolated from one another without the use of an ASM, thereby saving costs and improving functionality.

During reception on the receive side, the wireless communication device receives a received signal $RF_R$. This reception signal $RF_R$ often includes desired frequency components and undesired frequency components. To separate out the desired frequency components, the first and second reception phase shift selection circuits 230, 232, respectively, have different impedances that vary as a function of frequency. For example, the first reception phase shift selection circuit 230 is structured to represent an approximately matched impedance (e.g., 50 ohms) at a first desired reception frequency, and the second reception phase shift selection circuit 232 is structured to represent a high or infinite impedance at the first reception frequency. Consequently, only frequency components $RF_{F1}$ pass through the first reception phase shift selection circuit 230 (i.e., frequency components $RF_{F2}$ will be blocked from $RF_{F1}$). Similarly, only frequency components $RF_{F2}$ pass through the second reception phase shift selection circuit 232 (i.e., frequency components $RF_{F1}$ will be blocked from $RF_{F2}$).

After the frequency components have been separated from the received signal $R_{FR}$ in this manner, the first and second low noise amplifiers 234, 236 generate incoming signals $RF_{I1}$, $RF_{I2}$, respectively. The demodulator and signal analyzer 238 can then demodulate and analyze the incoming signals $RF_{I1}$, $RF_{I2}$ so the received data can be presented via a user interface of the wireless device.

Figure 3:
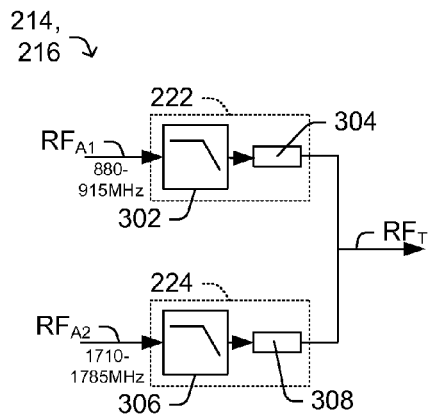
FIG. 3-4 show embodiments of phase shift selection circuits.
Figure 4:
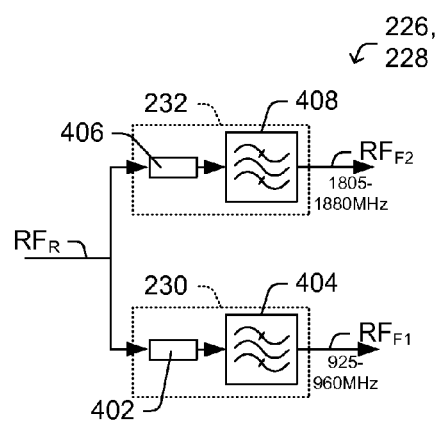

As shown in FIGS. 3-4, a communication phase shift selection circuit can comprise a passive circuit. These passive circuits that have different respective impedances that vary as a function of communication frequency. In FIG. 3's embodiment, the first transmission phase shift selection circuit 222 includes a low pass filter 302 and a phase shift matching filter 304. Similarly, the second transmission phase shift selection circuit 224 includes a low pass filter 306 and a phase shift matching filter 308. These low pass filters 302, 306 are used primarily for suppressing high frequency components generated by the power amplifier. The low pass filters 302, 306 work in conjunction with the phase shift matching filters 304, 308 to allow the desired transmission frequencies to pass, while blocking unwanted frequencies as previously discussed. In some embodiments, the phase shift matching filters 304, 308 can comprise microstrip lines that have different lengths or geometries on each path.

In FIG. 4, one can see an embodiment where the first reception phase shift selection circuit 230 includes a phase shift matching filter 402 and a surface acoustic wave (SAW) filter 404. Similarly, the second reception phase shift selection circuit 232 includes a phase shift matching filter 406 and a surface acoustic wave (SAW) filter 408. These phase shift matching filters 402, 406 and SAW filters 404, 408 are tuned to allow the desired reception frequencies to pass, while blocking unwanted frequencies as previously discussed. Again, in some embodiments, the phase shift matching filters 402, 406 can comprise microstrip lines that have different lengths or geometries on each path. Thus, the combination of SAW filters and microstrip lines can function as a diplexer in the receiver path.

In some embodiments, the power supply capacity of each SAW filter 404, 408 is about 15 dBm whereas a transmit power of about 35 dBm can be presented at the antenna transmit feed 208. As a result, about 20 dB of isolation between the transmission feed and reception feed may be desirable. This will prevent damage to the SAW filters and will prevent performance degradation due to too much power at the LNA input port.

Figure 5:
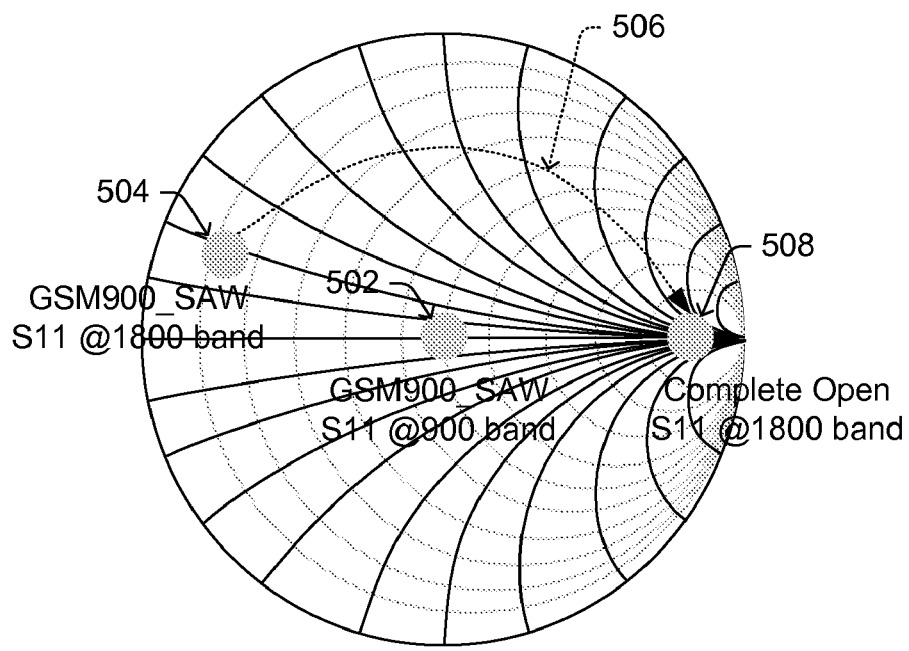
FIGS. 5-6 show Smith charts illustrating one manner in which phase shift selection circuits can be designed.
Figure 6:
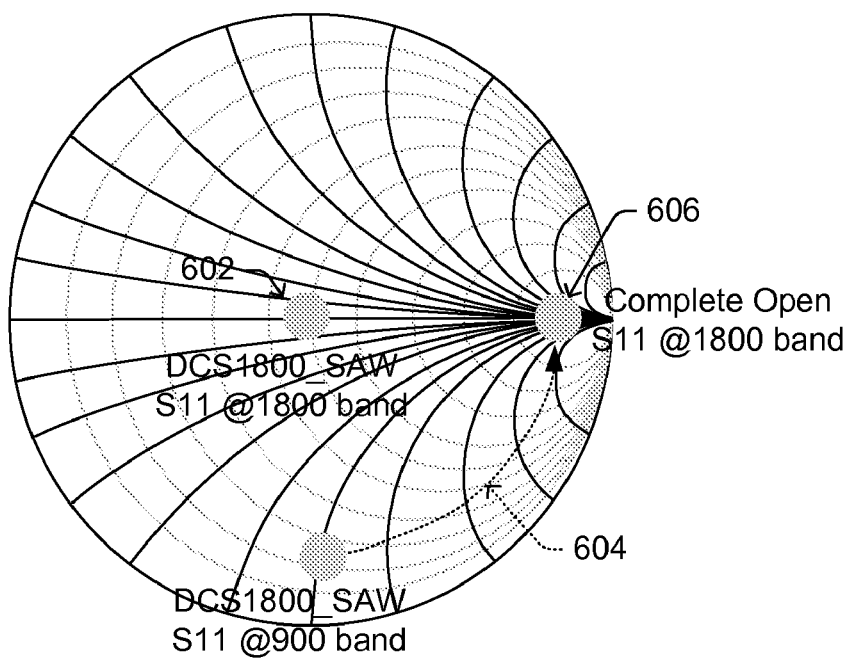

FIGS. 5-6 show more detailed embodiments of Smith charts illustrating one manner in which the matching can be accomplished on the receive-side. More specifically, FIG. 5 shows functionality of the first reception phase selection circuit 230 for different frequencies. At 502, which relates to 900 MHz received signals, the S parameter of the GSM900 SAW filter 404 approximates a closed switch and has a matched impedance of approximately 50 ohms (little or no attenuation). For signals received at 1800 MHz, the GSM900 SAW filter alone 504 still represents a near zero impedance, so the microstrip line 402 is included to provide a phase shift 506. This phase shift causes a significantly increased impedance for the first reception phase shift selection circuit 230 at 1800 MHz (508). In this way, the first reception phase shift selection circuit 230 allows low GSM frequencies to pass, and at the same time blocks DCS frequencies.

FIG. 6 shows the S parameter of the second phase shift selection circuit 232 for different frequencies. At 602, which relates to 1800 MHz received signals, the DCS SAW filter 408 approximates a closed switch having a matched impedance of approximately 50 ohms. At 900 MHz, however, the microstrip line 406 provides phase shifting 604 so the second phase shift selection circuit 232 will represent an infinite or very high impedance 606.

Figure 7:
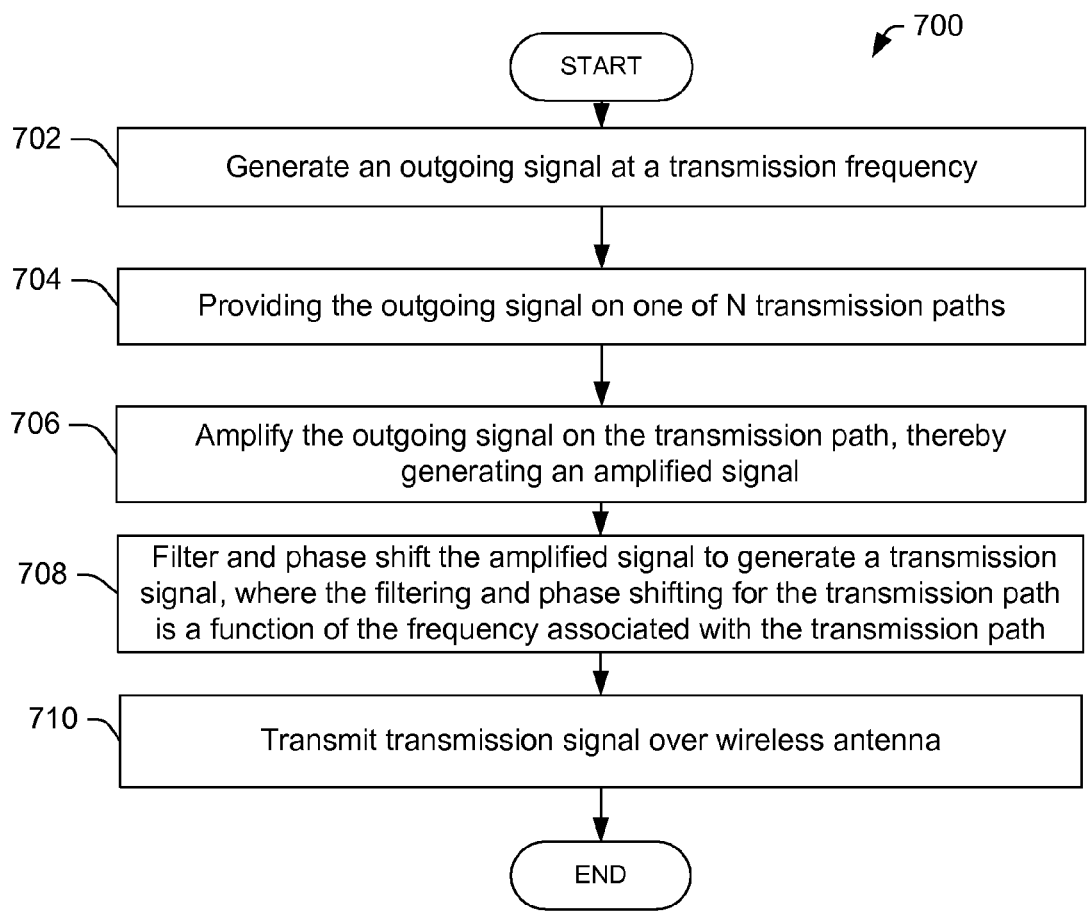
FIG. 7 shows a flow chart illustrating a method in accordance with one embodiment.
Figure 8:
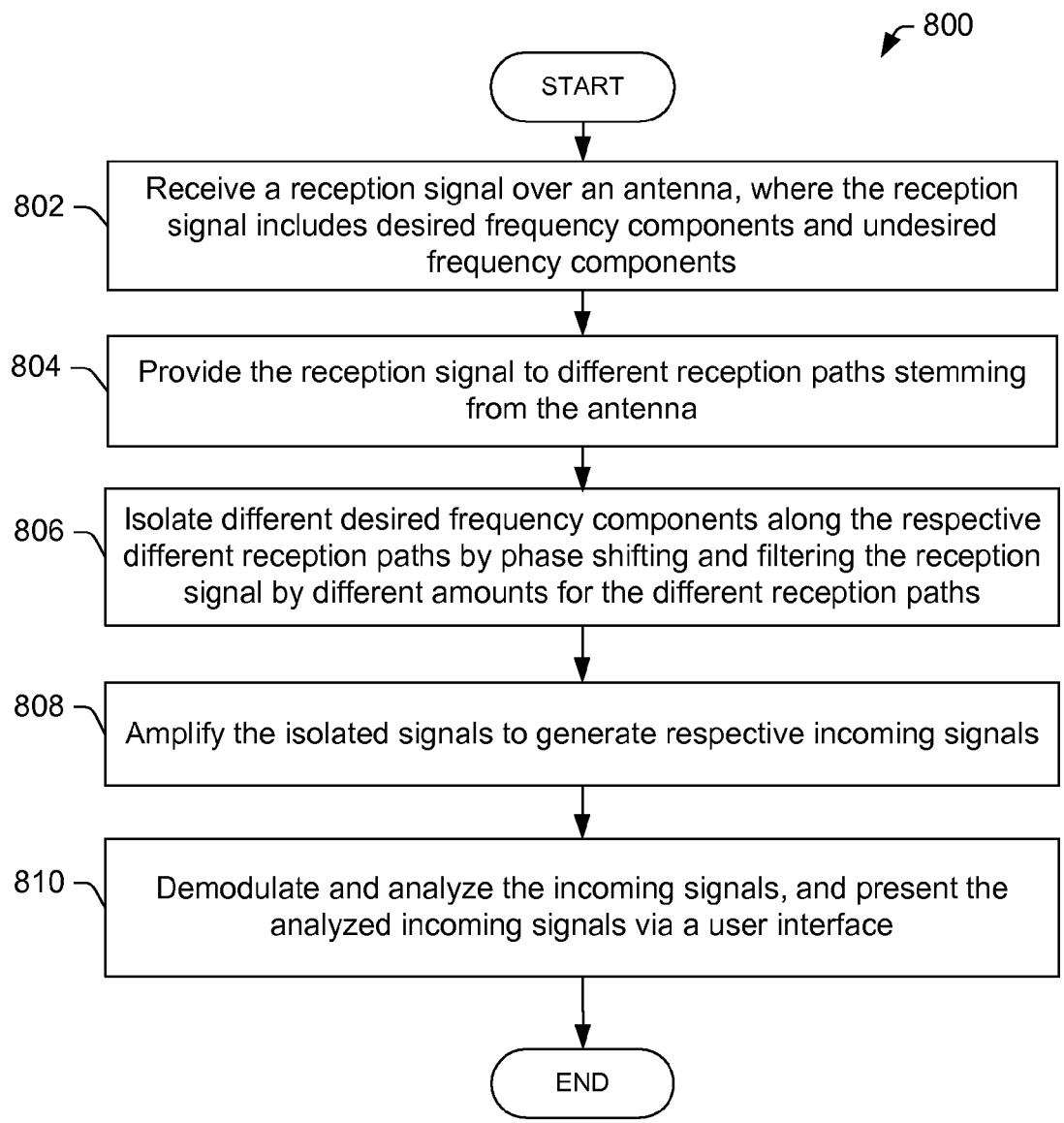
FIG. 8 shows a flow chart illustrating another method in accordance with one embodiment.

Now that some examples of systems have been discussed, reference is made to FIG. 7-8, which show methods 700, 800. FIG. 7 shows a method 700 for transmitting a wireless signal while FIG. 8 shows a method 800 for receiving a wireless signal. These methods 700, 800 may be carried out simultaneously with one another. While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required. Further, one or more of the acts depicted herein may be carried out in one or more separate acts or phases.

Referring now to FIG. 7, the method 700 starts at 702 where an outgoing signal is generated. The outgoing signal ($RF_{O1}$, $RF_{O2}$, ..., or $RF_{ON}$) is generated at a transmission frequency ($f_{T1}$, $f_{T2}$, ..., $f_{TN}$, respectively).

At 704, the outgoing signal is provided along one of N of transmission paths, where each transmission path is reserved for a different transmission frequency.

At 706, the outgoing signal ($RF_{O1}$, $RF_{O2}$, ..., or $RF_{ON}$) is amplified or modulated to generate an amplified signal ($RF_{A1}$, $RF_{A2}$, ..., or $RF_{AN}$).

At 708, the amplified signal is filtered and phase shifted to generate a transmission signal ($R_{FT}$). To provide sufficient isolation between the N transmission paths, each transmission path provides a unique combination of filtering and phase shifting. The combination of filtering and phase shifting is selected based on the transmission frequency associated with the particular transmission path used. In this way, each transmission path will allow one transmission frequency band to pass while blocking the other transmission frequency bands, much like a switch. At 710, after signal processing is complete, the transmission signal is transmitted over the wireless antenna.

Turning now to FIG. 8, one can see a method for efficiently receiving a signal. At 802, a reception signal is received over an antenna. The reception signal can include desired frequency components and undesired frequency components.

At 804, the reception signal is provided to different reception paths that stem from the antenna.

At 806, different desired frequency components are isolated along the respective different reception paths. This is achieved by phase shifting and filtering the reception signal by different respective amounts for the different reception paths.

At 808, the isolated signals are amplified to generate respective incoming signals. Each incoming signal has a different desired frequency component.

At 810, the incoming signals are demodulated and analyzed. After analysis, the signals can be presented via a user interface. For example, the user interface could include a speaker or a visual display, among others.

Although several implementations have been illustrated and described, alterations and/or modifications may be made to the illustrated examples without departing from the spirit and scope of the appended claims. For example, although some embodiments describe a wireless communication device as a cellular phone, in other embodiments the wireless communication device could be another type of communication device, including but not limited to: a personal digital assistant, a pager, a walkie-talkie, a music device, a laptop, etc.

Some methods and corresponding features of the present disclosure can be performed by hardware modules, software routines, or a combination of hardware and software. To the extent that software is employed, for example by a baseband processor or other processor associated with the radar system, the software may be provided via a "computer readable medium", which includes any medium that participates in providing instructions to the processor. Such a computer readable medium may take numerous forms, including but not limited to, non-volatile media, volatile media, and transmission media. Non-volatile media includes, for example, optical disks (such as CDs, DVDs, etc.) or magnetic disks (such as floppy disks, tapes, etc.). Volatile media includes dynamic memory, such as ferroelectric memory, SRAM, or DRAM. Transmission media includes coaxial cables, copper wire, fiber optics, etc. that could deliver the instructions over a network or between communication devices. Transmission media can also include electromagnetic waves, such as a voltage wave, light wave, or radio wave.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A circuit for efficient wireless communication, comprising:
    a transmission communication port configured to couple to a single antenna;
    a reception communication port, separate from the transmission communication port, and configured to couple to the single antenna, and wherein both the transmission communication port and the reception communication port are configured to interface with the single antenna concurrently when the single antenna is coupled thereto;
    a signal generator configured to generate a transmission signal in one of a plurality of different transmission frequency bands;
    a plurality of amplifiers, wherein each one of the plurality of amplifiers is associated with a respective one of the plurality of frequency bands, and wherein the signal generator is configured to direct the transmission signal to the appropriate amplifier based on the frequency band in which the generated transmission signal resides;
    a plurality of transmission phase shift selection circuits respectively associated with the plurality of amplifiers, wherein each of the plurality of transmission phase shift selection circuits exhibits a unique impedance associated with the respective frequency band, thereby passing signal frequencies within the respective frequency band and rejecting signal frequencies outside the respective frequency band, wherein an output of each of the plurality of transmission phase shift selection circuits is connected to the transmission communication port;
    a plurality of reception phase shift selection circuits, wherein each one of the plurality of reception phase shift selection circuits are associated with one of a plurality of different reception frequency bands, and wherein each of the plurality of reception phase shift selection circuits exhibit a unique impedance associated with their respective reception frequency band, thereby passing signal frequencies within the respective reception frequency band and rejecting signal frequencies outside the respective reception frequency band;
    a plurality of low noise amplifiers, wherein each one of the low noise amplifiers is associated with a respective one of the plurality of reception phase shift selection circuits; and
    a demodulator configured to receive a signal from each of the plurality of low noise amplifiers, wherein the demodulator is configured to receive and demodulate the signals to produce received data.

2. The circuit of claim 1, where each of the phase shift selection circuits comprise one or more passive circuits that are configured to provide different combinations of filtering and phase shifting for each phase shift selection circuit.

3. The circuit of claim 1, where each of the phase shift selection circuits comprise:
    a filter element adapted to pass the respective frequency band.

4. The circuit of claim 3, where the phase shift selection circuits further comprise:
    a microstrip line between the transmission or reception communication port, respectively, and the filter element.

5. The circuit of claim 1, wherein the single antenna comprises a high isolation dual feed antenna.

6. The circuit of claim 5, wherein the transmission communication port is connected to a transmission feed of the high isolation dual feed antenna, and the reception communication port is connected to a reception feed of the high isolation dual feed antenna.

7. The circuit of claim 5, wherein the high isolation dual feed antenna comprises a planar inverted F antenna.

* * * * *